United States Patent Office

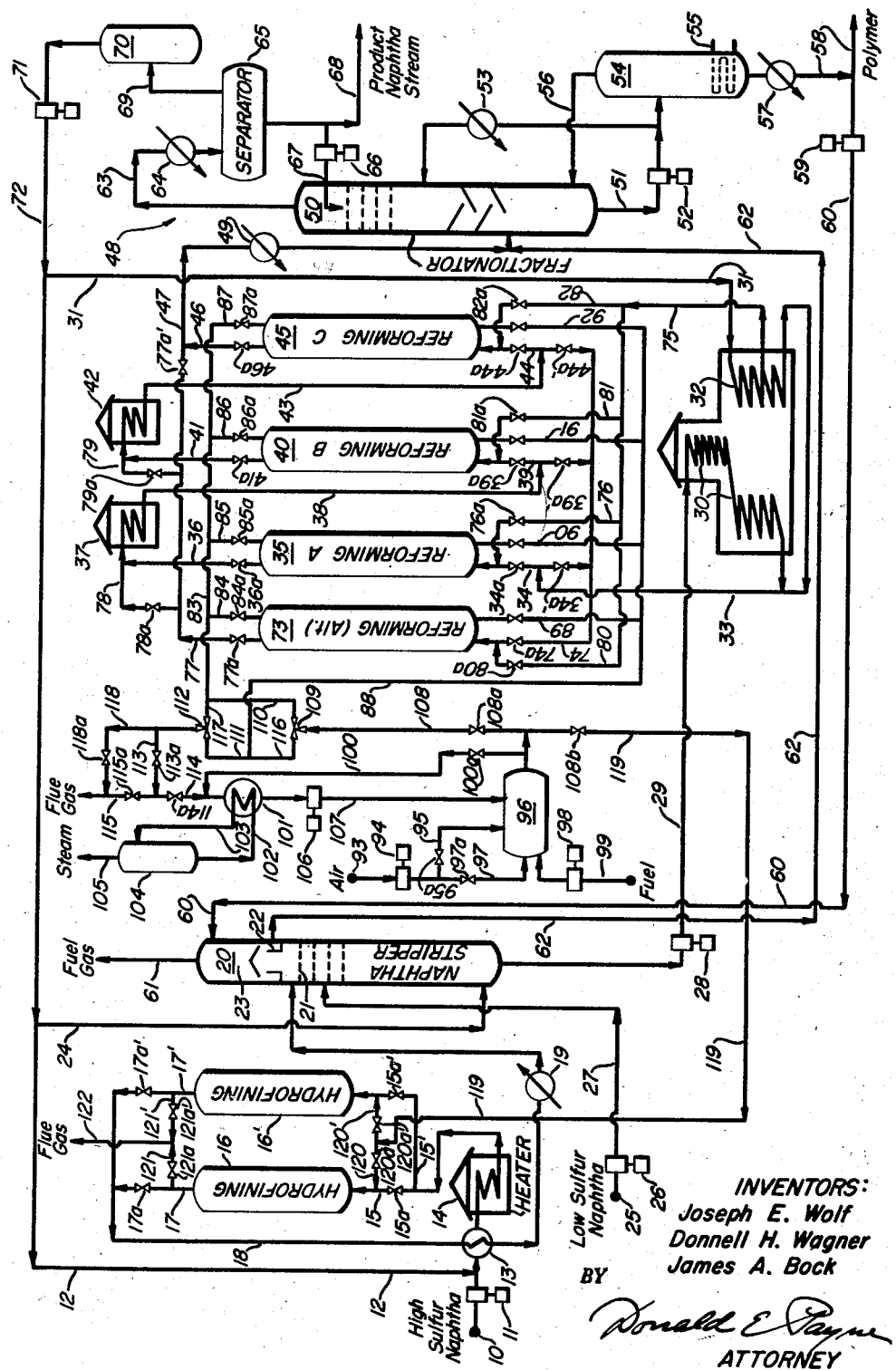

2,773,013
Patented Dec. 4, 1956

2,773,013

HYDROCARBON REFORMING SYSTEM FOR HIGH SULFUR NAPHTHAS

Joseph E. Wolf and Donnell H. Wagner, Hammond, and James A. Bock, Crown Point, Ind., assignors to Standard Oil Company, Chicago, Ill., a corporation of Indiana Application April 9, 1953, Serial No. 347,634

15 Claims. (Cl. 196—50)

This invention relates to a hydrocarbon reforming system for high sulfur naphthas and it pertains more particularly to a unitary combination system employing a platinum-on-alumina catalyst in the reforming step. In a co-pending application Serial 347,635, filed April 9, 1953, a system is described and claimed for reforming low sulfur low octane number naphtha by means of a regenerative platinum-on-alumina system for obtaining very high yields of very high octane number gasoline. High sulfur naphthas present a further problem in reforming operations since the reforming catalyst is at least temporarily poisoned by sulfur and it has been recognized that high sulfur charging stock should be desulfurized before being contacted with the platinum-on-alumina reforming catalyst. An object of our invention is to provide an improved unitary system for handling high sulfur naphthas whereby capital expenditures and operating costs may be minimized. A further object is to provide a system wherein the regenerative equipment employed in the reforming operation may be utilized for regenerating catalyst employed in the desulfurization step. Another object is to employ with greater effectiveness net hydrogen produced in the reforming step both for effecting desulfurization and effecting removal of moisture and H₂S from total charge entering the reforming step. A still further object is to integrate the reforming of high sulfur and low sulfur naphthas in a unitary operation for maximum flexibility to obtain maximum yields of valuable products. Other objects will be apparent as the detailed description of the invention proceeds.

The regenerative platinum-on-alumina reforming portion of the system is characterized by four reactors of which at least three are on-stream and one is an alternate reactor, a charging stock heater and two reheaters, connecting lines and valves for passing charging stock through the initial heater, a first on-stream reactor, a first reheater, a second on-stream reactor, a second reheater, and a third on-stream reactor while the alternate reactor is undergoing regeneration and rejuvenation, and a simple arrangement of connecting lines and valves whereby the alternate reactor may be substituted for any one of the on-stream reactors when the latter require regeneration and rejuvenation. The reforming portion of our system also includes regeneration and rejuvenation facilities: a flue gas generator, a regeneration and/or rejuvenation gas recycling system including a recycling compresser and a cooler and preferably an arrangement of three-way valves for reversing the flow of regeneration-rejuvenation or flue gases in the reactor which is not on-stream. This portion of the system is effective for handling low sulfur charging stocks and it is a part of our system for handling high sulfur charging stock.

For treating the high sulfur charging stock we employ a hydrodesulfurization step which may be effected in one or more hydrofining reactors utilizing a part of the net hydrogen produced in the reforming step. The hydrofined high sulfur naphtha may contain H₂S and to eliminate such H₂S the product effluent from this step is preferably condensed and stripped with another part of the net hydrogen produced in the reforming step. Low sulfur naphtha should likewise be stripped to remove any moisture and/or H₂S which it might contain and the same hydrogen in our system is employed for stripping both the low sulfur naphtha and the hydrofined high sulfur naphtha. Valuable hydrocarbons are recovered from the stripping gas by scrubbing with a so-called polymer or high boiling portion of the final reforming product.

The hydrofining catalyst may be periodically regenerated by gases produced in the reforming regeneration system, thereby enormously decreasing investment costs. Furthermore, when a low sulfur naphtha charge is available we may employ a single hydrofining reactor and simply increase the amount of low sulfur naphtha charged to the system, interrupting the high sulfur naphtha charge when the single hydrofining reactor requires regeneration.

The invention will be more clearly understood from the following detailed description of a specific example read in conjunction with the accompanying drawing which is a schematic flow diagram of a commercial unit for handling both high sulfur and low sulfur naphthas.

The unit described herein is designed to process 27,000 barrels per day of naphtha charging stocks having an API gravity of about 54.5°, an ASTM initial boiling point of about 130° F., a 10 percent point of 240° F., a 50 percent point of 280° F., a 90 percent point of 335° F. and an end point of 415° F. About half of the charge is of low sulfur content, i. e. is a low sulfur naphtha containing not more than about .1 weight percent and preferably not more than .05 weight percent sulfur. The high sulfur naphtha is higher in sulfur content and may contain .4 or more weight percent sulfur. The low sulfur charge contains no olefins and consists chiefly of paraffins and naphthenes, e. g. about 52 percent paraffins and 40 percent naphthenes and may be characterized by an octane number of approximately 45. The high sulfur naphtha may contain appreciable amounts of olefins, in this example 13 percent olefins, and may have an octane number of about 50 or 60, the octane number of the total mixture in this example being about 50.

The high sulfur naphtha charge from source 10 is introduced by pump 11 together with hydrogen from line 12 through heat exchanger 13 to heater 14 wherein the charge is vaporized and heated to a temperature of about 780° F. under pressure of about 220 p. s. i. g. The hot vapors are then passed by line 15 to hydrofining reactor 16 with valve 15a being open or by line 15′ to reactor 16′ when valve 15a′ is open, the dual arrangement being provided to allow one reactor to undergo regeneration while the other is on-stream. However, a single reactor may be employed in which case the flow of high sulfur naphtha will be discontinued when reactor 16 requires regeneration and the low sulfur naphtha feed increased during said interval to provide uniform charge rate to the reforming step.

The catalyst employed in reactor 16 may be any known desulfurization catalyst and in this case is conventional cobalt molybdate suported on alumina, the catalyst having a pill size of about ⅛ inch, a bulk density of about 60 pounds per cubic foot and being employed in a quantity of about 32 tons. Since hydrofining catalysts of this type and their equivalents are well known, no further description thereof is necessary.

The hydrofining reaction may be slightly exothermic. With about a thousand standard cubic feet of hydrogen gas per barrel of charge and with reaction about 700 to 780° F. at 220 p. s. i. g., a space velocity may be employed to give about a 90 weight percent sulfur conversion to H₂S under which conditions about 200 standard cubic feet of hydrogen per barrel of charge may be consumed.

The hydrofined product stream leaves reactor 16 by line 17 (or reactor 16' by line 17' when valve 17a' is open and valve 17a is closed) and is then passed by line 18 through heat exchanger 13 and cooler 19 to the upper part of stripper 20 in a section above trays or perforated plates 21 but below trapout system 22. Hydrogen and H₂S are separated from the condensed hydrofined charge and pass upwardly through the scrubbing section 23 at the top of vessel 20. Hydrogen from line 24 is introduced at the base of stripping vessel 20 so that the hydrofined product is countercurrently scrubbed with substantially H₂S-free hydrogen for removing any remaining H₂S which it might contain. The low sulfur naphtha component of the total charge is introduced from source 25 by pump 26 and line 27 to an intermediate level in vessel 20 below the level at which hydrofined charge is introduced thereto but substantially above the level at which hydrogen is introduced through line 24 so that any moisture and/or H₂S contained in the low sulfur naphtha may be stripped therefrom to prepare the total charge mixture for the reforming operation.

The total charge, which is now substantially free from H₂S and of low sulfur content, is passed by pump 28 through line 29 and heating coils 30 wherein the charge is vaporized and heated to about 950° F. at a pressure of about 220 p. s. i. g. A recycled hydrogen stream from line 31 is heated in coils 32 to a temperature of about 1050° F., about 4,000 standard cubic feet of recycled gas being employed per barrel of total naphtha charge and the recycled stream containing about 80 to 90 mol percent hydrogen. The combined hot hydrogen and hot charge vapors are mixed in line 33 and introduced by line 34 to reforming reactor 35, valve 34a being open and valve 34a' being closed.

Reactor 35 contains about 32 tons of platinum-on-alumina catalyst in the form of ⅛ inch pills, the bulk density of the catalyst being about 60 pounds per cubic foot. The catalyst is preferably one which has been prepared by contacting an aqueous solution of chloroplatinic acid containing from about 3.5 grams of platinum per liter with an ammonium sulfide solubilizing agent for converting the platinum into a solubilized form of platinum sulfide in a stable aqueous solution, then combining this true or colloidal solution with hydrous alumina prepared as taught in U. S. Reissue 22,196, the relative amounts of the two components being such as to produce a final catalyst containing about .3 to .5 percent or more of platinum by weight on a dry Al₂O₃ basis, the resulting mixture being then dried and calcined. The alumina may contain up to approximately 1 percent by weight of fluorine (although it is preferably fluorine-free) and it may contain a small amount of titania but it should be substantially free from sodium, iron and molybdenum oxides since the latter have been found to poison the resulting catalyst. Other methods of preparing the alumina base may be employed but best results are obtained by using an alumina of the highest purity obtainable. Also other methods may be employed for incorporating the platinum but since these form no part of the present invention, they will not be described in further detail.

The dried and calcined catalyst in the reactor has previously been brought to reaction temperature and pressure by the circulation of a hot hydrocarbon and/or hydrogen gas therethrough and if a hydrocarbon gas is employed for heating purposes, it is preferably purged from the system before the heated charging stock is introduced. The mixture of hot charging stock and hydrogen (the latter usually being a recycled gas containing about 80 to 90 mol percent hydrogen and employed at the rate of about 1,000 to 8,000, e. g. 4,000 standard cubic feet per barrel of charge) is introduced into reactor 35 at about 980° F. Due to the endothermic nature of the reaction, the partially converted charge is at a temperature of about 860° F. and it leaves the reactor 35 through line 36 (valve 36a being open) which leads to first reheater 37 wherein the partially converted charge is brought back to a temperature of about 980° F. It is then introduced by line 38 and inlet line 39 (valve 39a being open and valve 39a' being closed) to reactor 40 at an inlet pressure of about 200 p. s. i. g. Reactor 40 contains the same amount of the same type of catalyst as employed in reactor 35 and here again the reaction is endothermic, the partially converted charge at a temperature of about 900° F. being passed through line 41 (valve 41a being open) which leads to second reheater 42 wherein the partially converted charge is brought back to a temperature of about 980° F. It is then introduced by line 43 and inlet line 33 (valve 44a being opened and valve 44a' being closed) to the third reactor 45 which likewise contains the same amount of the same type of catalyst as employed in the prior reactors. Due to pressure drop in reactor 40, heater 42, etc. the inlet pressure to reactor 45 will be about 190 p. s. i. g. The final product stream leaves reactor 45 through line 46 (valve 46a being open) and line 47 to gas separation and product fractionation system 48.

The product fractionation system may be conventional and therefore will not be described in detail. By way of schematic illustration, product from line 47 is introduced through heat exchanger 49 then to a low point in fractionator column 50 from the base of which materials boiling above about 400° F. are withdrawn as uncondensed liquid through line 51 by pump 52. A part of this stream is recycled through cooler 53 and introduced at an intermediate level in the column for scrubbing ascending vapors. The rest of the high boiling material or "polymer" is introduced to a stripper 54 which is provided with suitable heating means 55 at its base, the components removed by stripping being returned by line 56 to the base of the fractionator 50 and the final polymer being withdrawn through cooler 57 and line 58. A part of this polymer is introduced by pump 59 and line 60 to the top of vessel 20 for scrubbing ascending hydrogen and removing therefrom the normally liquid hydrocarbons which would otherwise be lost with fuel gas discharged through line 61. The enriched polymer is returned from trapout plate 22 by line 62 to a low point in fractionator 50 so that recovered low boiling naphtha components may be recombined with the product stream.

Overhead from fractionator 50 passes by line 63 and cooler 64 to separator 65 which may operate at about 170 p. s. i. g. and about 100° F. A part of the condensate from the separator is returned by pump 66 and line 67 for supplying reflux in the top of fractionator 50. The net amount of condensate from separator 65 is withdrawn by line 68 to a depropanizer and thence to a debutanizer (neither shown) for ultimate product recovery. This plant is designed to obtain as final products about 5 weight percent propane and lighter gases, approximately 5 weight percent butanes, about 89 weight percent C₄-free 400° F. end point gasoline and about 1 weight percent polymer, all based on naphtha charge. Of the C₃ and lighter gases approximately 35 weight percent may be C₃ hydrocarbons and of the lighter materials about 94 mol percent is hydrogen. The C₄-free 400° F. end point product may be characterized by an API gravity of about 46.0°, an ASTM initial boiling point of about 120° F., 10 percent point of about 200° F., a 50 percent point of about 270° F. and 90 percent point of about 330° F. and it should have an F–1 octane number (clear) of about 93. The polymer may have a 90 percent point of about 580° F. and an end point of about 700° F. and have an API gravity of about 11.0°.

Gas from separator 65 is passed by line 69 to surge drum 70 from which it is recycled by compressor 71 and line 72 to supply the hydrogen hereinabove specified for lines 12, 24 and 31 respectively.

After the system has been on-stream for one or more days there will be a decline in activity of the catalyst particularly in lead reactor 35. The extent to which product octane number falls off may be minimized by increasing the charge inlet temperatures to one or more of the reactors or decreasing the charge rate but with the 200 p. s. i. naphtha conversion in the presence of platinum-on-alumina catalyst maximum yield octane number relationships are obtained by periodically regenerating and rejuvenating the catalyst. The lead reactor may require such regeneration and rejuvenation more frequently than the final reactor and we have provided a system in which an alternate reactor 73 may take the place of any one of the on-stream reactors 35, 40 and 45 by a remarkably simple arrangement of valves and connections. Thus after about a day or two on-stream the fresh catalyst in alternate reactor 73 may be brought to conversion temperature (as hereinabove described), valves 78a, 77a, 74a and 34a' are opened (77a' being closed) so that the introduced charge may flow through line 74 to reactor 73 and valve 34a is closed. To displace or purge hydrocarbons from reactor 35 hot recycle hydrogen from lines 75 and 76 is introduced to reactor 35 by opening valve 76a. When the purging of reactor 35 is complete, valves 76a and 36a are both closed. The charge to the first reheater is now coming from reactor 73 through lines 77 and 78, valves 77a and 78a being open and valve 77a' being closed.

In a similar manner alternate reactor 73 can take the place of reactor 40 by opening valves 39a' and 79a and closing valves 39a, 41a, 34a' and 78a. Alternate reactor 73 may take the place of reactor 45 by opening valves 44a' and 77a' and closing valves 44a, 46a, 39a' and 79a. The hydrogen purge of reactor 73 is effected by opening valve 80a in line 80, the purging of reactor 40 is effected by opening valve 81a in line 81, and the purging of reactor 45 is effected by opening valve 82a in line 82. The hot hydrogen for effecting such purging steps may be a portion of such recycle hydrogen which does not pass through heater 32 or it may be a part of the recycled hydrogen which has passed through only a part of the heating coils in heater 32 (as shown).

Referring next to the regeneration and rejuvenation system, we provide an upper regeneration gas line 83 with connections 84, 85, 86 and 87 to reactors 73, 35, 40 and 45 respectively. Similarly we provide a bottom regeneration gas line 88 with connections 89, 90, 91 and 92 to reactors 73, 35, 40 and 45 respectively. Each of the regeneration gas connecting lines leading to a reactor is provided with a valve designated by the connection line reference character followed by "a," e. g. 84a, 85a, etc. In connections leading to on-stream reactors these valves are, of course, closed.

Air for flue gas preparation, regeneration and rejuvenation is supplied from source 93 by compressor 94 which compresses it to a pressure up to about 220 p. s. i. g. The compressed air may be introduced through line 95 and valve 95a to a down stream portion or secondary combustion area of flue gas generator 96 and/or the compressed air or portion thereof may be introduced through line 97 in valve 97a to the inlet end or primary combustion area of the flue gas generator along with fuel gas introduced by compressor 98 from source 99. A pilot flame or other ignition device (not shown) is provided in the primary combustion zone and the proportion of fuel gas introduced by compressor 98 to air introduced by line 97 is controlled to give efficient combustion. During start up operations all air is introduced through line 97 for generation of flue gas which leaves vessel 96 through line 100 (valve 100a being open and valves 108a and 108b being closed) through heat exchanger 101 wherein the flue gas is cooled to about 850° F. by water from line 102 for generation of steam which is discharged by line 103 to separator 104, the net stream production being discharged through line 105 (water inlet not shown). The cooled flue gas is returned by circulating compressor 106 and line 107 to flue gas generator 96, this operation being continued till the pressure in the flue gas generator reaches approximately 220 p. s. i. g. at which time the temperature of the flue gas due to circulation through the cooler will not substantially exceed about 850° F.

At this stage valve 108a is opened and the flue gas is passed by line 108 through three-way valve 109 and lines 110, 83 and 85 to the top of reactor 35 (assuming that this reactor is to undergo regeneration and that valves 34a, 76a and 36a are closed). The flue gas flows downwardly through the reactor and purges out hydrogen, the purged gas being withdrawn through lines 90 (valves 90a and 85a being open), 88 and 111 through three-way valve 112 to line 113 (valve 113a being open) to line 114 until the pressure in line 114 is sufficient to open valve 115a which may be set to open at about 210 p. s. i. g. for venting gases through line 115. Hence the pressure in line 114 thus reaches the desired operating pressure. Valve 114a is opened and valve 100a may be closed since the desired cooling may now be effected by gas which is recycled from line 114 through cooler 101 and circulating compressor 106 to the flue gas generator. It may be desirable to vent the bulk of the purged hydrogen through line 115 before opening valve 114a and closing valve 100a.

The circulation of flue gas through the reactor is continued while the introduction of fuel and air to vessel 96 is substantially eliminated so that the temperature of the catalyst bed in reactor 35 is not only purged from hydrogen but is brought to a temperature of about 850° F. At this stage a small amount of air is introduced into the circulating stream in amounts controlled by valve 95a to initiate combustion of carbonaceous deposits on the catalyst, the amount of introduced air being controlled to prevent the combustion front from substantially exceeding about 1050° F. The combustion front thus slowly traverses the reactor bed, the net volume of produced gases being vented through line 115 and the circulating stream being cooled to a temperature in the range of about 700 to 850° F. by heat exchanger 101. When the combustion front has completely traversed the bed the catalyst is fully regenerated in that all carbonaceous deposits have been burned and most of the bed is at a temperature not substantially higher than about 850° F., the circulating stream during regeneration having an oxygen partial pressure not substantially exceeding .3 atmosphere (i. e. about 2 percent oxygen in recirculating flue gas).

While the regeneration of platinum type catalyst will bring its selectivity and activity substantially back to its original level, regeneration alone is not adequate because after long periods on-stream it is found that activity falls off at much more rapid rates and that there is a sharp increase in selectivity decline. In order to maintain the catalyst at high activity and selectivity, to prevent an unduly rapid rate of activity decline and to insure against any loss in yield-octane number relationship we next effect a rejuvenation of the catalyst. This rejuvenation is effected by increasing the oxygen partial pressure of the circulating gas to at least .4 atmosphere and preferably to about 1 to 4 atmospheres and increasing the temperature of the catalyst bed to at least reaction temperature and preferably to a temperature of about 950 to 1200° F., e. g. 1050° F. At this stage sufficient fuel gas is introduced into vessel 96 with the required amount of air through line 97 to markedly increase the temperature of the circulating gas stream and additional air is introduced through line 95 to markedly increase the oxygen partial pressure in the circulating stream. For best results valve 114a is closed and a hot compressed air is passed through the catalyst bed diluted with only the amount of flue gas which is produced by the necessary combustion of fuel to heat the compressed air to the rejuvenation temperature. Flue gas dilution of the compressed air may be eliminated by provision of a fired indirect air heater but usually this separate equipment is unnecessary in 200 p. s. i. g. operations since the amount of flue gas dilution in the air heating step does not lower the oxygen partial pressure below operable limits. The passage of hot compressed air through the catalyst bed is preferably continued until the entire bed temperature is elevated to above 950° F. and is preferably elevated to about 1050° F. When the bed temperature reaches this level the rate of heated compressed air introduction may be markedly reduced since it is only necessary that the catalyst be in contact with the hot oxygen at the defined oxygen partial pressure for the necessary time to insure rejuvenation, the gas flow for heating and temperature maintenance being sufficient for any required sweeping action. The time will depend upon the particular catalyst, charging stock, etc. and on the length of time and/or number of cycles the catalyst has been on-stream. A catalyst which is 50 percent deactivated requires a much longer time than a catalyst which is only 5 or 10 percent deactivated. For relatively fresh catalyst which is deactivated only to a slight extent rejuvenation may be effected in a matter of 5 or 10 minutes while with a catalyst which has been used a long period of time and has been deactivated to a greater extent the rejuvenation time may be 10 hours or more, badly deactivated catalysts having been rejuvenated for as long as 24 hours. It is preferred to rejuvenate the catalyst before its activity or selectivity has appreciably declined in which case effective rejuvenation may be obtained by contact with oxygen having a partial pressure of about 1 to 4 atmospheres at a temperature in the range of 950 to 1100° F. for a time of about .1 to 10 hours, e. g. about 5 hours. In some cases rejuvenation may be effected at temperatures lower than 950° F., particularly with long contact time and high oxygen partial pressure.

When rejuvenation has been complete the catalyst must next be purged from oxygen before hydrogen is reintroduced thereto. The oxygen purge is effected by discontinuing the introduction of air through lines 95 and 97, introducing fuel gas by compresser 98 and opening valve 114a so that the oxygen in the circulating gas stream is all burned by introduced fuel gas and flue gas is once more being cycled through the catalyst bed. During this oxygen purge step the temperature of the circulating gases may be lowered by heat exchanger 101 so that the reactor bed temperature is brought back to conversion temperature when rejuvenation is effected at a higher temperature. At the time of the oxygen purge it is preferred to reverse the flow of the gas stream through the reactor bed and this is accomplished simply by switching the position of valves 109 and 112 so that gases from line 108 will flow through lines 116, 88 and 90 into the bottom of vessel 35 and gases from the top thereof flow through lines 85, 83 and 117 to discharge line 113. The oxygen purge may be discontinued when the lower part of the catalyst bed is at about reaction temperature even though the upper part of the bed is slightly above reaction temperature.

After the oxygen purge is completed and the circulating gas, now flowing from the bottom to the top of the reactor, is oxygen-free flue gas valve 107a is closed and valve 100a is opened, valve 90a is closed and valve 76a is opened to purge the flue gas out of the reactor with hot recycle hydrogen. This so-called hydrogen purge of flue gas is continued until substantially all flue gas is eliminated through line 85 after which time valves 76a and 85a may be closed and the reactor is ready to go on-stream by opening valves 36a and 34a and closing valves 34a' and 78a. While reactor 35 is on-stream the alternate reactor 73 may be regenerated and rejuvenated in the manner above described so that it may subsequently again replace reactor 35 or replace reactor 40 or 45.

If desired the purging steps may be effected at reduced pressure by opening valve 118a in line 118, which leads to vent line 115, and closing valve 113a. It is not essential, however, that any of the operations be at reduced pressure and a pressure of at least 100 p. s. i. g. and preferably at least about 200 p. s. i. g. is required for optimum reaction and rejuvenation, such pressure being advantageous also for the regeneration step.

The described arrangement of valves 109 and 112 enables simple and expeditious reversal of flow through a catalyst bed which is undergoing regeneration-rejuvenation and/or purging substantially instantaneously and as frequently as may be advantageous or desirable. The optimum method of operation will be somewhat dependent on the amount of carbonaceous deposits to be burned in the regeneration step and operating temperatures, oxygen concentrations, etc. but with the system hereinabove described we are enabled to attain maximum flexibility.

As employed herein the term "activity" is the catalyst's property of directing the conversion to a product of the desired high octane number in the range of about 90 to 100 at the defined temperature, space velocity and operating pressure. Relative activity has reference to activity of fresh catalyst. Thus if it requires twice as much used catalyst to produce the octane number from a given charge attainable by a given amount of fresh catalyst at the same temperature, pressure and charge rate, the relative activity of the used catalyst is 50 percent. Activity may also be defined by improvement of octane number; i. e. a catalyst which converts a 45 octane number naphtha to a 95 octane number product is more active than one which converts such naphtha to a product of only 90 octane number under the same operating conditions. Activity may also be measured by the temperature required to produce a given octane number; a catalyst which will produce a 95 octane number product at 920° F. is more active than a catalyst which requires 950° F. to produce the same octane number under the same operating conditions of pressure and space velocity with the same feed stock.

Selectivity of the catalyst is its property of limiting the conversion to dehydrogenation, aromatization and isomerization as opposed to cracking, disproportionation and the formation of gas, coke and higher boiling materials. A catalyst of high selectivity should produce at least about 90 percent by weight of $C_3$-free 400° F. end point gasoline from a charging stock as hereinabove defined. Without rejuvenation, a catalyst which has been used for a number of days (particularly in later cycles of operation) loses its ability to direct the conversion in the desired channel and results in formation of large amounts of hydrocarbon gases, coke, polymer, etc. Loss in activity may be balanced by use of higher temperatures and/or lower space velocity but loss of selectivity inevitably means loss of valuable product. The system hereinabove described is designed to not only maintain the catalyst at high activity but also to prevent loss of selectivity during continuous repeated cycles of on-stream reaction, regeneration and rejuvenation. The plant operator can readily determine by the temperature drop across each reactor and the quality of the reactor effluent whether or not the activity and selectivity of the catalyst therein has decreased to such an extent that regeneration and rejuvenation are advisable. The length of on-stream runs in each reactor will depend upon the nature of the catalyst, the composition of the charging stock, the severity of the treatment and other variables but, generally speaking, a catalyst bed should not remain on-stream if its relative activity has dropped more than 50 percent or if it converts as much as 10 weight percent of the naphtha charge to products other than high octane number $C_3$-free 400° F. end point gasoline.

It will be observed from the foregoing that combustion furnace 96 serves the multiple function of generating flue gas for purging operations, supplying flue gas diluent for regeneration, heating air for the rejuvenation step and purging oxygen from the circulating gas stream after rejuvenation. A separate air heater may be employed for the air heating step so that the rejuvenation air will not be diluted with flue gas but ordinarily a sufficiently high oxygen partial pressure can be obtained by operating in the manner hereinabove described with chamber 96 serving the function of an air heater.

Not only does the fuel gas generator thus supply the needs of the reforming system but it also supplies the requirements of the hydrofining system when the catalyst bed therein requires regeneration. Thus flue gas from vessel 96 (whether generated therein or recycled thereto) may be passed through line 119 by opening valve 108b and introduced through line 120' (valve 120a being closed and 120a' being opened) to hydrofining reactor 16' for supplying the purging gas and regeneration gas required when the catalyst in this chamber has been on-stream for a period of about 5 to 10 days. The flue gas and regeneration gases may be purged from reactor 16' through line 121' and 122, valve 121a' being open and valve 121a being closed. The method of regenerating the hydrofining catalyst forms no part of the present invention, the catalyst may be generated by any means known to those skilled in the art and requires no rejuvenation. By thus integrating the hydrofining regeneration system with the regeneration equipment employed in the hydroforming section of our system, considerable investment expense is avoided. As heretofore pointed out, even further economy may be effected by employing only a single hydrofining reactor, interrupting the charge of high sulfur naphtha when it is necessary to regenerate the hydrofining catalyst and doubling the flow rate of the low sulfur naphtha during that period that the high sulfur naphtha is not being charged.

In ordinary hydrofining operations hydrogen is recycled from the hydrofined products back to charge entering the hydrofining reactor; in our process, however, the flow of hydrogen through the hydrofining reactor is on a once-through basis which greatly increases the desulfurization effectiveness of the hydrofining step.

From the foregoing description it will be seen that we have accomplished the objects of our invention and while we have illustrated the invention by a specific example, it should be understood that alternative arrangements, operating procedures and conditions will be apparent to those skilled in the art. Thus in this example the on-stream conversion, regeneration, rejuvenation and purging steps are all effected at approximately 200 p. s. i. g. and it should be understood that the regeneration, rejuvenation and purging steps need not be at the same pressure as the conversion step and that the conversion step may be above or below 200 p. s. i. g. although it is preferably within the range of about 100 to 350 p. s. i. g. In this example the on-stream space velocity in each reactor is approximately five pounds of liquid charge per hour per pound of catalyst but this space velocity may range from about two pounds of charge per hour to ten pounds per hour per pound of catalyst depending on the activity of the particular catalyst. The temperature at which charge enters the reactor may be higher or lower than 980° F. but is preferably in the range of about 950 to 1000° F. The regeneration and rejuvenation steps may be more or less than the time hereinabove described but about 1 to 10 hours is the preferred range for each of these treatments.

We claim:

1. The method of converting a low octane number naphtha containing more than .1 percent sulfur and rich in paraffins and naphthenes into a high octane number naphtha product which method comprises hydrofining said naphtha by contacting it with a sulf-active hydrogenation catalyst in the presence of added hydrogen under conditions to effect desulfurization, reforming said hydrofined naphtha with a platinum-containing reforming catalyst consisting essentially of platinum-on-alumina under conditions including an inlet temperature of at least about 950° F. for increasing the octane number of said naphtha and producing hydrogen, separating hydrogen from the reforming product stream, recycling a part of said hydrogen to the reforming step, recycling another part of said hydrogen to the hydrofining step, periodically regenerating at least a part of the platinum-containing catalyst while other parts of the platinum-containing catalyst are on-stream by contacting said part of the platinum-containing catalyst with flue gas containing added oxygen to substantially remove carbonaceous deposits of combustion and then contacting the substantially carbon-free catalyst with a gas having an oxygen partial pressure of at least .4 atmosphere at a temperature approximating the temperature employed in the reforming step for a time sufficient to restore the catalyst substantially to its original activity, recycling gas leaving the regenerating step through a temperature control zone back to said regeneration step and employing at least a part of the recycled gas stream from the temperature control zone for effecting regeneration of a part of the hydrofining catalyst while said last named catalyst is not on-stream.

2. The method of claim 1 which includes the steps of introducing compressed air into said temperature control zone, burning fuel with a part of the compressed air to supply heat and flue gas in said temperature control zone and abstracting heat from flue gas which is recycled through said temperature control zone during the initial stage of the platinum catalyst regeneration step.

3. The method of claim 1 which includes the steps of maintaining the reforming catalyst in four separate zones including three on-stream zones and an alternate zone and replacing an on-stream zone with said alternate zone while effecting regeneration of catalyst in the replaced on-stream zone.

4. A unitary system for converting a high sulfur low octane number naphtha into a low sulfur high octane number naphtha product which comprises a first heater, a hydrofining reactor, connections for passing hydrogen and naphtha through said first heater to said hydrofining reactor, a naphtha stripper and connections for introducing naphtha from the hydrofining reactor to said stripper, a second heater, four reforming chambers, first and second reheaters, a product fractionator, a hydrogen separator, connections for passing naphtha from said stripper through said second heater through one reformer reactor then through a first reheater then through another reformer reactor then through another reheater and finally through a third reformer reactor and thence to said product separator, connections for substituting the fourth reformer reactor for any one of the on-stream reactors when the latter requires regeneration, connections for introducing light products including hydrogen from said fractionator to said separator, connections for returning part of the hydrogen from said separator to a connection leaving the second heater, connections for returning another part of the hydrogen from said separator to said naphtha stripper, connections for returning a third part of the hydrogen from said separator to said first heater, a flue gas cooler, a flue gas generator and heater, connections for introducing flue gas from the flue gas generator and heater to the reformer reactor which is undergoing regeneration, connections for passing at least a part of the gases leaving said last named reactor through said flue gas cooler for recycle to said reactor and connections for introducing flue gas containing oxygen from said flue gas generator to the hydrofining reactor when it is undergoing regeneration.

5. The system of claim 4 which includes a third heater and connections for heating hydrogen therein before it is introduced into the discharge side of the second heater.

6. The system of claim 4 which includes a gas scrubber for receiving gases from said stripper, connections including a cooler for introducing high boiling liquid from the product fractionator to the upper part of the scrubber and connections for returning liquid from the base of the scrubber to the product fractionator.

7. The method of converting separate naphtha charging stocks, one of which contains less than .1 percent sulfur and is called low sulfur charge and the other of which contains more than .1 percent sulfur and is called high sulfur charge, which method comprises comingling said high sulfur charge with a first recycled hydrogen stream and hydrofining said charge with a desulfurization catalyst under conditions for effecting desulfurization, condensing the desulfurized product stream and introducing it at the upper part of a stripping zone, introducing a low sulfur charge at a low point in said stripping zone, introducing a second recycled hydrogen stream at the base of said stripping zone, withdrawing stripped naphtha from the bottom of the stripping zone and heating it to a temperature of about 950 to 1000° F., heating a third recycled hydrogen stream to a temperature of about 1000 to 1100° F., comingling said last named heated stream with the stripped naphtha stream heated to about 950 to 1000 F. and passing the combined stream through a first reaction zone containing platinum-on-alumina catalyst under pressure of approximately 100–350 p. s. i. g. at a space velocity in the range of 2 to 10 pounds of naphtha charge per hour per pound of catalyst to effect partial conversion of said naphtha, reheating the partially converted naphtha and hydrogen to a temperature in the range of about 950 to 1000° F. and contacting it with a second platinum-on-alumina catalyst bed at a slightly lower pressure and at a space velocity in the range of about 2 to 10 pounds of naphtha charge per hour per pound of catalyst, reheating the effluent stream from the second bed to a temperature in the range of about 950 to 1000 F. and contacting it with a third platinum-on-alumina catalyst bed at a slightly lower pressure and a space velocity in the range of about 2 to 10 pounds of naphtha charge per hour per pound of catalyst, separating hydrogen from the product leaving the third bed, compressing said separated hydrogen and employing portions of said compressed hydrogen for supplying said first, second and third recycle streams.

8. The method of claim 7 which includes the step of discontinuing the introduction of high sulfur charge to the hydrofining step when the hydrofining catalyst becomes relatively spent, regenerating the hydrofining catalyst while the charge thereto is interrupted and increasing the amount of low sulfur charge introduced during the period of high sulfur charge interruption.

9. The method of claim 7 which includes the steps of periodically replacing a platinum-on-alumina catalyst bed with an alternate catalyst bed, generating flue gas, employing said flue gas and oxygen for effecting regeneration and rejuvenation of the replaced catalyst bed, then returning the replaced catalyst bed to on-stream position.

10. The method of converting a high sulfur, low octane number naphtha into a low sulfur high octane number product, which method comprises heating said naphtha and a first hydrogen stream to a hydrofining temperature and contacting it under hydrofining conditions with a sulfur-immune hydrofining catalyst for converting its sulfur content to H2S, cooling the hydrofined product to effect condensation of hydrofined naphtha, stripping the condensate with a second hydrogen stream for removing H2S and light hydrocarbons from the hydrofined naphtha, heating hydrofined naphtha from the stripping step and a third hydrogen stream and introducing the heated naphtha and third hydrogen stream at a temperature of at least about 950° F. into a first reforming zone containing platinum-on-alumina catalyst at a pressure in the range of about 100 to 350 p. s. i. g., effecting endothermic conversion in the first reforming zone, reheating the effluent from the first reforming zone to a temperature of at least about 950° F. and introducing it into a second endothermic reforming zone containing platinum-on-alumina catalyst, reheating effluent from the second reforming zone to a temperature of at least about 950° F. and introducing it into a third endothermic reforming zone containing platinum-on-alumina catalyst, cooling the effluent stream from the reforming steps to effect condensation of the product naphtha, separating hydrogen from the condensate and returning separated hydrogen to form said first, second and third hydrogen streams, respectively.

11. In a unitary process for converting a sulfur-containing low octane number naphtha into a high octane number product wherein the naphtha is first hydrofined over a sulfur-immune catalyst for converting its sulfur content to H2S, the hydrofined naphtha is hydroformed with platinum-on-alumina catalyst in a multistage, regenerative, hydroforming system wherein the effluent from each hydroforming stage except the last is reheated before being introduced into the next succeeding stage, wherein hydrogen is separated from hydroformed product, most of the separated hydrogen is recycled to the hydroforming system and a part of the separated hydrogen is introduced into the hydrofining system and wherein each stage of the hydroforming system is connected by manifolds to a regeneration section provided with a flue gas generator, a flue gas circulator, a flue gas cooler and a vent line, the improvement which comprises cooling the effluent from the hydrofining step to effect condensation of hydrofined charge, introducing the cooled effluent to the upper part of a stripping zone, introducing a low sulfur naphtha into the stripping zone at a lower level than that at which cooled effluent from the hydrofining zone is introduced thereto, introducing a part of the separated hydrogen at the base of said stripping zone, preheating stripped naphtha from the base of the stripping zone and introducing it together with preheated hydrogen to the hydroforming zone and periodically effecting regeneration of said hydrofining catalyst by supplying gases thereto from the regeneration section of the hydroforming system.

12. The method of claim 11 which includes the step of removing condensables from gases leaving the top of the stripping zone by scrubbing said gases with a high boiling fraction of hydroformed product.

13. A unitary system for converting a sulfur-containing low octane number naphtha into a high octane number naphtha product by hydrofining with a sulfur-immune hydrogenation catalyst followed by reforming with a platinum-on-alumina catalyst with intermediate stripping, which system comprises: a first heater, a hydrofining reactor, connections for passing hydrogen and naphtha through said first heater to said hydrofining reactor, a cooler, a naphtha stripper and connections for introducing naphtha from the hydrofining reactor through said cooler to said stripper, a second heater, four reforming reactors, first and second reheaters, a product separation section, a pump and connections for passing naphtha from said stripper through said second heater through the first of said reforming reactors, then through a first reheater, then through a second of said reforming reactors, then through another reheater, then through a third of said reforming reactors and finally to said product separation section, connections for substituting the fourth of said reforming reactors for any one of the on-stream reactors when catalyst in the latter reqires regeneration, connections for returning part of the product hydrogen from said separation section to the first reforming reactor, connections for returning another part of the product hydrogen from said separation section to said naphtha stripper, connections including a hydrogen compressor for returning a third part of the hydrogen from said separation section to said first heater, a flue gas generator and heater, a flue gas cooler, connections for introducing flue gas from the flue gas generator and heater to the reforming reactor which is undergoing regeneration, a flue gas compressor, connections for passing a part of the gases leaving said last named reactor through said flue gas cooler, flue gas compressor and flue gas heater for recycle with added air to said reactor, and connections for introducing flue gas, together with added air, from said flue gas generator to the hydrofining reactor when it is undergoing regeneration.

14. The system of claim 13 which includes a scrubber, an inlet leading from the top of the naphtha stripper to the base of the scrubber, a connection for introducing high boiling product from the product separation section to the upper part of said scrubber and a connection for returning rich scrubber liquid from the lower part of the scrubber to the product separation section.

15. The system of claim 13 which includes an additional inlet line leading to the naphtha stripper for introducing a substantially sulfur-free naphtha directly into the stripping zone so that it may be stripped in admixture with hydrofined naphtha and may form a part of the total stream introduced into the second heater.

References Cited in the file of this patent

UNITED STATES PATENTS

| | | |
|---|---|---|
| 2,273,298 | Szayna | Feb. 17, 1942 |
| 2,310,244 | Lassiat | Feb. 9, 1943 |
| 2,411,726 | Holroyd et al. | Nov. 26, 1946 |
| 2,417,308 | Lee | Mar. 11, 1947 |
| 2,488,033 | Johnson | Nov. 15, 1949 |
| 2,573,149 | Kassel | Oct. 30, 1951 |
| 2,606,862 | Keith | Aug. 12, 1952 |
| 2,642,381 | Dickinson | June 16, 1953 |
| 2,654,694 | Berger et al. | Oct. 6, 1953 |
| 2,665,239 | Howard et al. | Jan. 5, 1954 |
| 2,671,754 | De Rosset et al. | Mar. 9, 1954 |
| 2,691,623 | Hartley | Oct. 12, 1954 |